UNITED STATES PATENT OFFICE.

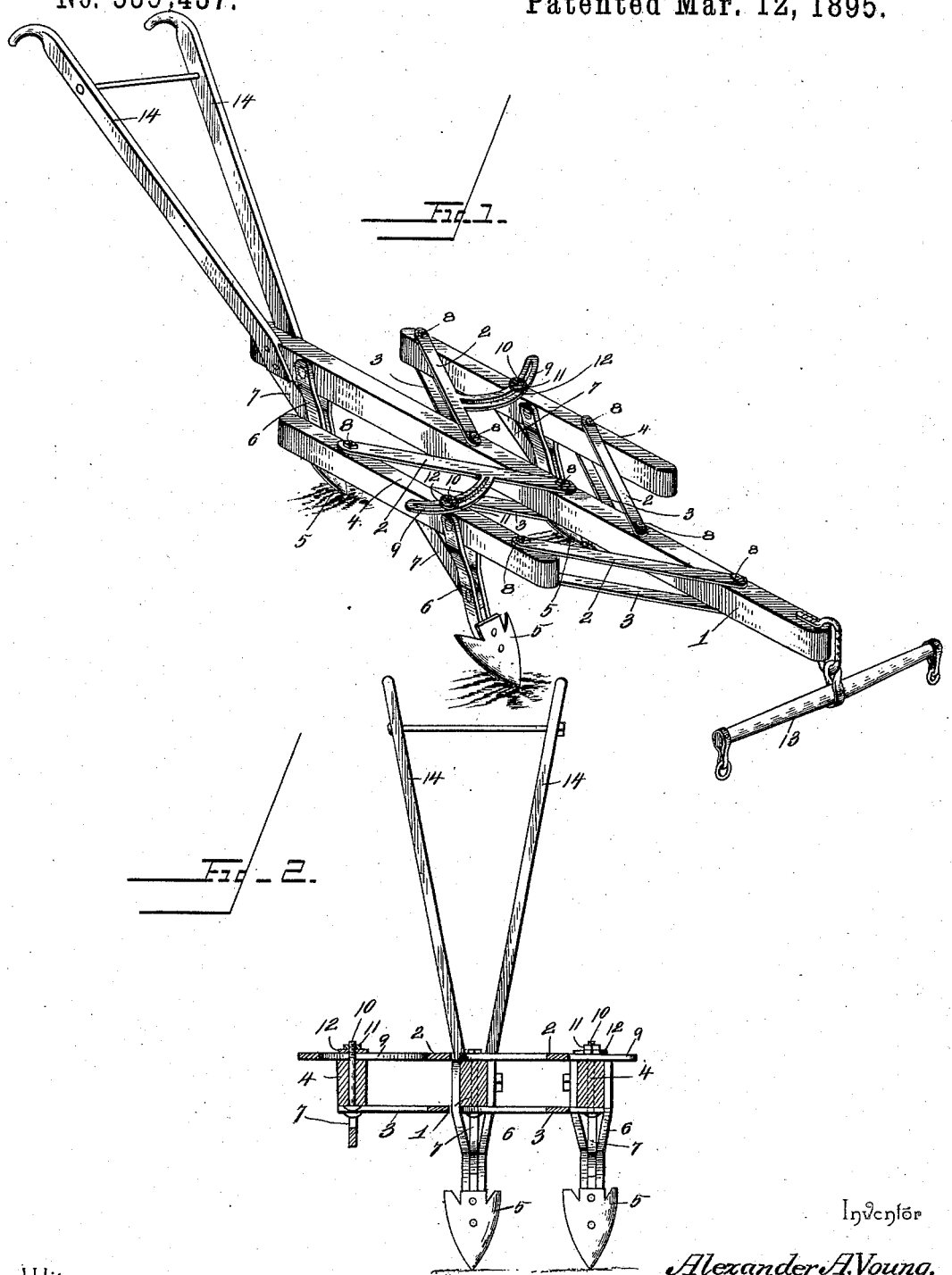

ALEXANDER A. YOUNG, OF FORT MILL, SOUTH CAROLINA.

CULTIVATOR.

SPECIFICATION forming part of Letters Patent No. 535,437, dated March 12, 1895.

Application filed December 29, 1894. Serial No. 533,346. (No model.)

*To all whom it may concern:*

Be it known that I, ALEXANDER A. YOUNG, a citizen of the United States, residing at Fort Mill, in the county of York and State of South Carolina, have invented a new and useful Cultivator, of which the following is a specification.

The invention relates to improvements in cultivators.

The object of the present invention is to provide an adjustable cultivator having central and side beams, and to enable the side beams to be readily adjusted to and from the central beam, and to enable the same to be quickly secured at the desired adjustment.

A further object of the invention is to enable the side beams to be removed to permit the cultivator to be used as an ordinary plow, corn coverer, and the like.

The invention consists in the construction and novel combination and arrangement of parts hereinafter fully described, illustrated in the accompanying drawings, and pointed out in the claims hereto appended.

In the drawings: Figure 1 is a perspective view of a cultivator constructed in accordance with this invention. Fig. 2 is a transverse sectional view of the same.

Like numerals of reference indicate corresponding parts in both figures of the drawings.

1 designates a central beam, to which is connected, by upper and lower link bars 2 and 3, side beams 4, which are capable of movement to and from the central beam, to arrange them the desired distance therefrom, to set cultivator blades 5 in the desired position, relative to one another.

The cultivator blade 5 may be of any desired construction, and they are secured to inclined depending standards 6, which have their upper ends secured to the beams, and which are supported by rearwardly disposed braces 7.

The upper and lower link bars 2 and 3 are provided at their ends with perforations, and are detachably and hingedly connected to the beams by vertical bolts 8, passing through the beams and the ends of the adjacent link bars, the latter being disposed in pairs.

The rear upper link bars are provided with curved arms 9, disposed horizontally, and extending outward from the link bars and preferably formed integral therewith, and provided with curved slots arranged longitudinally of the arms. The arms 9 extend across the upper faces of the side beams, and receive clamping bolts 10 thereof having nuts 11, engaging plates 12, which span the slots of the arms and clamp the same, whereby the side and central beams are rigidly connected, at any desired adjustment.

A whiffletree 13 is connected to the front end of the central beam, and a pair of handle bars 14 is attached to the rear end of the same.

It will be seen that the side beams are capable of being rigidly secured any desired distance from the central beam to space properly the cultivator blades, and that either or both of the side beams may be removed to adapt the cultivator for use as an ordinary single plow, or as a corn coverer, or the like. The standards of the cultivator blades are composed of opposite sides, detachably secured to the beams; and they may be removed, in order that harrow teeth may be applied to the beams when desired.

Changes in the form, proportion, and the minor details of construction may be resorted to without departing from the principle or sacrificing any of the advantages of this invention.

What I claim is—

1. In a cultivator, the combination of the central and side beams, link bars having their ends pivotally connected to the beams, and a curved arm extending from one of the link bars, and adjustably clamped to the side beam, substantially as described.

2. In a cultivator, the combination of the central beam, side beams located at opposite sides of the central beam, the upper and lower link bars disposed at an angle to the beams and having their ends pivotally connected to the same, the curved arms extending from the upper link bars and arranged on the upper faces of the side beams, and provided with curved slots, and clamping bolts mounted on the side beams and arranged in said slots and adjustably securing the arms to the side beams, substantially as described.

In testimony that I claim the foregoing as my own I have hereto affixed my signature in the presence of two witnesses.

ALEXANDER A. YOUNG.

Witnesses:
GEORGE W. WILKINSON,
JOHNSON Y. STARNES.